E. DETWILER.

Assignor to S. & T. DAUCHY.

Stove Platform.

No. 9,277. Reissued July 6, 1880.

Witness:

Charles R. Searle.

D. P. Cowl

E. Detwiler

Inventor:

S. T. Dauchy assignee of entire interest,

By Worth Wagoner

Attorney.

N. PETERS, PHOTO-LITHOGRAPHER, WASHINGTON, D. C.

UNITED STATES PATENT OFFICE.

EMANUEL DETWILER, OF MILWAUKEE, WISCONSIN, ASSIGNOR TO SAMUEL T. DAUCHY.

STOVE-PLATFORM.

SPECIFICATION forming part of Reissued Letters Patent No. 9,277, dated July 6, 1880.

Original No. 124,039, dated February 27, 1872. Application for reissue filed May 3, 1880.

*To all whom it may concern:*

Be it known that I, EMANUEL DETWILER, of Milwaukee, in the county of Milwaukee and State of Wisconsin, have invented certain new and useful Improvements in Non-Conducting Platforms or Mats, of which the following is a full, clear, and exact description, reference being had to the accompanying drawings, and to the letters of reference marked thereon.

My invention has relation to that class of devices usually employed beneath stoves, and ordinarily denominated "non-conducting platforms or mats;" and the object thereof is to produce a neat, substantial, and cheap platform, from which the stove cannot be accidentally displaced, and which at the same time affords all that is desirable in the matter of non-conducting qualities sufficient to insure protection against overheating of the surface upon which the platform rests.

To accomplish this the invention consists, essentially, in covering the board with metal, leaving a raised rim all around the outer edge thereof; and it also consists in certain new and useful combinations or arrangements of parts, all of which will be hereinafter first fully described, and then pointed out in the claims.

Figure 1:
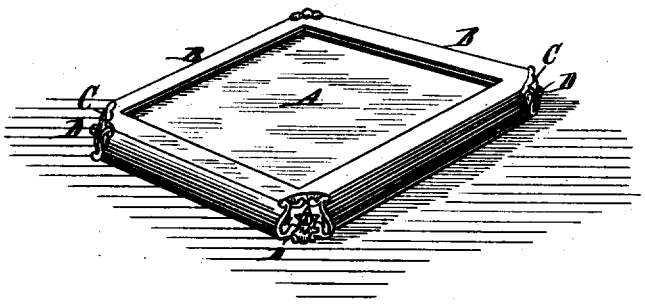
Figure 2:
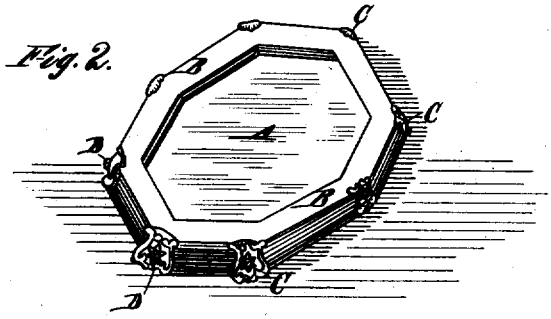
Figure 3:
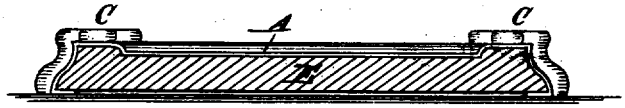

In the drawings, Figure 1 is a perspective view illustrating my invention as applied to a square platform, and Fig. 2 is a similar view illustrating the same as applied to an octagonal platform. Fig. 3 is a vertical section of my improved platform, showing clearly the construction and arrangement which is contemplated by my invention.

Like letters, wherever they occur, indicate corresponding parts in all the figures.

Heretofore, in this class of devices, wherein a metal covering has been applied upon an interior non-conductor or filler, the upper surface of the platform has been of such a character as to admit of the stove being accidentally pushed off, and as the platform is of considerable thickness it is desirable that such accidents be guarded against. To do this I provide a sunken center, or rather a raised rim, bead, or molding around the portion upon which the stove stands, and this prevents the feet of the stove from being shoved off of the space intended for them to rest upon.

A is the central sunken part of the body of the metal covering upon which the stove-feet are supposed to rest, and B is an elevated edge, bead molding, or rim extending all around the central part. This bead is formed in the metal, which is bent down, as shown in Fig. 3, all around the perimeter of the structure, and rests upon the floor when the platform is in place beneath the stove. By this construction a finished outline is provided for the structure, and dust and débris prevented from accumulating beneath the platform.

The wooden interior, E, is first prepared, and the metal covering is spun out or cast, and the edges raised and turned over and under the filling, thus forming a protection for the filling and producing a suitable non-heat-conducting structure which is easy to clean and not liable to damage during use and shipment.

The raised edge B of the metal covering, if not stiffened or supported upon its under side, would be liable to become damaged or indented by contact of the stove-feet therewith, and to obviate this I fill the under side completely, as plainly shown in the sectional view. The raised edge B is also useful in contributing additional strength and rigidity to the board or platform, so that no warping or sagging can occur when placed on edge, as when not employed beneath the stove.

At C are fastened pieces useful to be applied for the purpose of holding the metal covering in place. These fastenings are made so that they hook on over the corners, holding the metal down, and also hook on under the metal, and, with the screw D, secure the interior filling and its metal cover against accidental separation.

When constructed and arranged substantially in accordance with the foregoing description the raised edge keeps the stove in place, and the improved platform is found to admirably answer the several purposes or objects of the invention, as previously stated.

The board or frame E is made light as is consistent with the required rigidity, and with the protection from heat required in this class of devices.

Having now fully described my invention, what I claim as new, and desire to secure by Letters Patent, is—

1. In a stove-supporting platform or mat of the character herein set forth, a raised rim or bead surrounding the central part, made continuous therewith and with the finished perimeter, which extends down to the floor-line, and adapted to operate substantially as shown and described.

2. In a stove-supporting platform or mat of the character herein set forth, composed of a metal cover and an interior filling, the combination, with the central or flat portion, of a surrounding raised rim, substantially as and for the purposes set forth.

3. In a stove-supporting platform or mat of the character herein set forth, composed of a metal cover and an interior filling, the combination, with said cover and filling, of the corner pieces, C, substantially as shown and described.

4. In a stove-supporting platform or mat of the character herein set forth, the combination, with the corners thereof, of separable metallic corner pieces, substantially as shown and described.

5. In a stove-supporting platform or mat having a surrounding raised rim or edge, the combination, with said rim, of an interior filling. substantially as and for the purposes set forth, 6. In a stove-supporting platform or mat, the combination of an interior filling, an exterior metallic covering, and a raised rim or edge formed in the said covering, substantially as shown and described.

7. In a stove-supporting platform or mat, the combination of an interior filling, an exterior metallic covering, and a raised edge or rim formed in the covering, said rim being sustained upon its interior by a filling, substantially as shown and described.

8. A stove-platform made with sunken body A, raised edge B, fastenings C, and screw D, in combination with the frame-work E, substantially as described.

9. Sunken body A and raised edge B, in combination with fastenings C, substantially as described.

In testimony that I claim the foregoing I have hereunto set my hand in the presence of two witnesses.

EMANUEL DETWILER.

Witnesses:

STANLEY S. STOUT,
GEO. K. DAUCHY.